(12) United States Patent
Lee

(10) Patent No.: US 9,212,071 B2
(45) Date of Patent: Dec. 15, 2015

(54) SYSTEM AND METHOD FOR FILTERING

(71) Applicant: KOLON INDUSTRIES, INC., Kwacheon-si, Kyunggi-do (KR)

(72) Inventor: Kwang-Jin Lee, Yongin-si (KR)

(73) Assignee: Kolon Industries, Inc., Kwacheon-si (KR)

( * ) Notice: Subject to any disclaimer, the term of this patent is extended or adjusted under 35 U.S.C. 154(b) by 0 days.

(21) Appl. No.: 14/626,759

(22) Filed: Feb. 19, 2015

(65) Prior Publication Data

US 2015/0175446 A1    Jun. 25, 2015

Related U.S. Application Data

(62) Division of application No. 13/141,277, filed as application No. PCT/KR2009/007654 on Dec. 22, 2009, now Pat. No. 8,980,087.

(30) Foreign Application Priority Data

Dec. 22, 2008    (KR) .......................... 10-2008-0131449

(51) Int. Cl.
| | | |
|---|---|---|
| *B01D 61/20* | (2006.01) | |
| *B01D 61/22* | (2006.01) | |
| *C02F 1/44* | (2006.01) | |

(Continued)

(52) U.S. Cl.
CPC . *C02F 1/44* (2013.01); *B01D 61/18* (2013.01); *B01D 61/20* (2013.01); *B01D 61/22* (2013.01);
(Continued)

(58) Field of Classification Search
CPC ........ B01D 61/02; B01D 61/12; B01D 61/08; B01D 61/10; B01D 61/14; B01D 61/18; B01D 61/20; B01D 61/22; B01D 61/58; B01D 2313/12; B01D 2313/125; B01D 2313/13; B01D 2313/24; B01D 2313/243; B01D 2313/28; B01D 2319/04; B01D 2317/04; B01D 2317/06; B01D 2311/08; B01D 2311/04; B01D 2311/06; B01D 2311/14; B01D 65/02; B01D 65/027; B01D 2321/00; B01D 2321/20; B01D 2321/26; B01D 2321/40

See application file for complete search history.

(56) References Cited

U.S. PATENT DOCUMENTS 5,620,605 A    4/1997    Møller
5,922,201 A    7/1999    Yamamori et al.
(Continued)

FOREIGN PATENT DOCUMENTS

| JP | 2000-271409 A | 10/2000 |
| JP | 2002-126460 A | 5/2002 |
| WO | WO 02/058827 A1 | 8/2002 |

OTHER PUBLICATIONS

Korean Office Action for Korean Application No. 10-2008-0131449, dated Jul. 31, 2012.

*Primary Examiner* — Katherine Zalasky
(74) *Attorney, Agent, or Firm* — Birch, Stewart, Kolasch & Birch, LLP

(57) ABSTRACT

A filtering method using a filtering system is disclosed, which is capable of accomplishing a first water bath into which a first membrane cassette and a first membrane cassette for concentrate are submerged, a second water bath into which a second membrane cassette and a second membrane cassette for concentrate are submerged, a first pump for supplying a first negative pressure to the first membrane cassette, a second pump for supplying a second negative pressure to the second membrane cassette, and a common pump for supplying a third negative pressure to the first and second membrane cassettes for concentrate, stopping an operation of the first pump; interrupting the third negative pressure supplied from the common pump to the first membrane cassette for concentrate; and cleaning the first membrane cassette and the first membrane cassette for concentrate.

2 Claims, 4 Drawing Sheets

(51) Int. Cl.
  *B01D 65/02* (2006.01)
  *B01D 61/18* (2006.01)
  *B01D 63/08* (2006.01)

(52) U.S. Cl.
  CPC ............ *B01D 65/02* (2013.01); *B01D 2311/14* (2013.01); *B01D 2315/06* (2013.01); *B01D 2317/022* (2013.01); *B01D 2317/04* (2013.01); *C02F 2209/03* (2013.01); *C02F 2303/20* (2013.01)

(56) References Cited

U.S. PATENT DOCUMENTS

| | | | |
|---|---|---|---|
| 6,214,231 B1 * | 4/2001 | Cote | B01D 61/142 210/636 |
| 7,220,358 B2 * | 5/2007 | Schacht | B01D 65/00 210/636 |
| 2005/0126963 A1 | 6/2005 | Phagoo et al. | |

* cited by examiner

SYSTEM AND METHOD FOR FILTERING

CROSS-REFERENCE TO RELATED APPLICATIONS

This application is a Divisional of co-pending application Ser. No. 13/141,277 filed on Jun. 21, 2011, which is the national phase of PCT International Application No. PCT/KR2009/007654 filed on Dec. 22, 2009, which claims priority to Application No. 10-2008-0131449 filed in the Republic of Korea on Dec. 22, 2008. The entire contents of all of the above applications are hereby incorporated by reference.

TECHNICAL FIELD

The present invention relates to a system and method for filtering, and more particularly, to a system and method for filtering, which is capable of accomplishing a filtering operation at a high recovery rate of 96% or more, and realizing a compact and simplified system structure.

BACKGROUND ART

A separation method using a membrane has lots of advantages over the method based on heating or phase-changing. Among the advantages is high reliability of water treatment since the water purity required can be easily and stably satisfied by adjusting the size of the pores of a membrane. Furthermore, since the separation method using a membrane does not require a heating process, a membrane can be used with microorganism which is useful for separation process but may be adversely affected by heat.

The membrane employing separation methods may include a method using a hollow fiber membrane module which comprises a bundle of hollow fiber membranes; and a method using a flat sheet membrane module. Conventionally, the membrane module has been widely used in a microfiltration field for producing axenic water, drinking water, super pure water, and so on. Recently, however, the application of the hollow fiber membrane module is being expanded to include sewage and waste water treatment, solid-liquid separation in a septic tank, removal of suspended solid (SS) from industrial wastewater, filtration of river, filtration of industrial water, and filtration of swimming pool water.

One kind of the membrane modules is a submerged-type membrane module which is submerged into a water bath filled with fluid to be treated. Negative pressure is applied to the inside of the membranes, whereby only fluid passes through the wall of each membrane and solid elements such as impurities and sludge are rejected and accumulate in the water bath. Generally, the plural submerged-type membrane modules are used by the unit of cassette installed in a frame.

In more detail, as shown in FIG. 1, feed water to be treated is stored in a water tank 20, and is supplied to a water bath 10 where plural membrane cassettes 11 are submerged thereinto. As a constant negative pressure is applied to the plural membrane cassettes 11 by a suction pump 30, only fluid passes through the wall of each membrane in the membrane cassettes 11, and solid elements such as impurities and sludge are rejected. Fluid passing through the membranes 11 (hereinafter, referred to as 'filtered water') is provided to a filtered-water tank (not shown).

The plural membrane cassettes 11 are provided in the water bath 100 while being maintained at sufficient intervals, whereby the feed water supplied to the inside of the water bath 100 passes evenly through the respective membrane cassettes 11. Thus, when a water treatment process reaches an equilibrium condition, the respective membrane cassettes 11 treat the feed water of the similar impurity concentration.

The respective membrane cassettes 11 has about 90% recovery rate, wherein the recovery rate indicates the quantity of filtered water produced by the membrane cassettes 11 with respect to the total quantity of feed water supplied to the membrane cassettes 11. Thus, the filtering system shown in FIG. 1 has only about 90% recovery rate. That is, even though residue discharged out of the water bath 10 after being treated by the plural membrane cassettes 11 is in a slurry type containing a large amount of solid elements, a considerable amount of untreated water still remains in the slurry-type residue.

As a result, there is a need for an additional concentration apparatus 400 so as to recover the water which has not been collected by the plural membrane cassettes 11. This concentration apparatus 400 generally uses a fabric filter or a rough filtering method such as a sandblast method. In this reason, the water recovered by the concentration apparatus 400 can not be regarded as being the same as the water recovered by the membrane cassettes 11. Thus, the water additionally recovered by the concentration apparatus 40 is provided to the water tank 20, which can not be incorporated into the calculation for the total recovery rate of the filtering system.

In order to accomplish the total recovery rate of 96% or more, the filtering system shown in FIG. 1 requires more filtration capacity corresponding to the additional recovery rate, and requires the additional concentration apparatus 40, which is disadvantageous in that the filtering system becomes complicated and uneconomical.

Another method for raising the total recovery rate is to provide a 2-stage filtering system including two water baths instead of the aforementioned concentration apparatus 40. That is, in addition to the main water bath 10, there is the supplementary water bath for additionally recovering the water from the residue discharged out of the main water bath 10 by using the membrane cassettes submerged into the supplementary water bath. This 2-stage filtering system is advantageous in that the first filtering process using the main water bath enables to recover the treated water amounting to about 90% of the total feed water, and the following second filtering process using the supplementary water bath enables to additionally recover the treated water amounting to about 6% of the total feed water. However, this 2-stage filtering system is also problematic because it requires the additional structure for the second filtering process.

DISCLOSURE

Technical Problem

Therefore, the present invention has been made in view of the above problems, and it is an object of the present invention to provide a system and method for filtering, which is capable of preventing one or more problems of the related art.

Another object of the present invention is to provide a system and method for filtering, which is capable of accomplishing a filtering operation at a high recovery rate of 96% or more, and realizing a compact and simplified system structure.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, there is provided a filtering system comprising a water bath including an inlet and a discharging hole, wherein feed water to be treated is supplied to the inside of the water bath through the inlet, and concentrated water produced through filtering is discharged out through the discharging hole; and plural membrane cassettes including first and second membrane cassettes submerged into the feed water contained in the water bath, wherein the first membrane cassette is positioned nearest to the inlet, and the second membrane cassette is positioned nearest to the discharging hole, wherein the first membrane cassette treats the feed water with a first impurity concentration; the second membrane cassette treats the feed water with a second impurity concentration; and the first impurity concentration is smaller than the second impurity concentration.

In another aspect of the present invention, a filtering system comprises a first water bath into which a first membrane cassette and a first membrane cassette for concentrate are submerged; a second water bath into which a second membrane cassette and a second membrane cassette for concentrate are submerged; a first pump for supplying a first negative pressure to the first membrane cassette; a second pump for supplying a second negative pressure to the second membrane cassette; and a common pump for supplying a third negative pressure to the first and second membrane cassettes for concentrate.

In another aspect of the present invention, a filtering method comprises treating feed water supplied to the inside of a water bath at a first flux by using a first membrane cassette; and re-treating the feed water treated by the first membrane cassette at a second flux by using a second membrane cassette, wherein the first flux is higher than the second flux.

In another aspect of the present invention, a filtering method using a filtering system, wherein the filtering system comprises a first water bath into which a first membrane cassette and a first membrane cassette for concentrate are submerged; a second water bath into which a second membrane cassette and a second membrane cassette for concentrate are submerged; a first pump for supplying a first negative pressure to the first membrane cassette; a second pump for supplying a second negative pressure to the second membrane cassette; and a common pump for supplying a third negative pressure to the first and second membrane cassettes for concentrate, comprises stopping an operation of the first pump; interrupting the third negative pressure supplied from the common pump to the first membrane cassette for concentrate; and cleaning the first membrane cassette and the first membrane cassette for concentrate.

Advantageous Effects

According to a system and method for filtering of the present invention, even though a filtering operation using a water bath is carried out, it is capable of accomplishing a high recovery rate of 96% or more.

Also, since the high recovery rate of 96% or more can be accomplished in the filtering operation, there is no need for an additional concentration apparatus, or an additional structure for multi-stage filtration such as an additional water bath, whereby the system for filtering according to the present invention is capable of realizing a compact and simplified system structure.

Also, the system and method for filtering according to the present invention can improve cleaning efficiency of the membrane while minimizing an interruption of the filtering operation.

BEST MODE

Reference will now be made in detail to the preferred embodiments of the present invention, examples of which are illustrated in the accompanying drawings. Wherever possible, the same reference numbers will be used throughout the drawings to refer to the same or like parts.

The term "filtering membrane" used in this specification indicates all types of membranes which are capable of being used for a submerged-type filtering apparatus, for example, a flat sheet membrane, a hollow fiber membrane, and etc.

The term "impurity" used in this specification indicates all types of solid elements contained in water.

The term "impurity concentration" used in this specification indicates a concentration of impurity measured when a water treatment process reaches an equilibrium condition. Herein, the impurity concentration is measured at least 24 hours after starting the water treatment process.

Hereinafter, a system and method for filtering according to the present invention will be explained with reference to the accompanying drawings.

Figure 1:
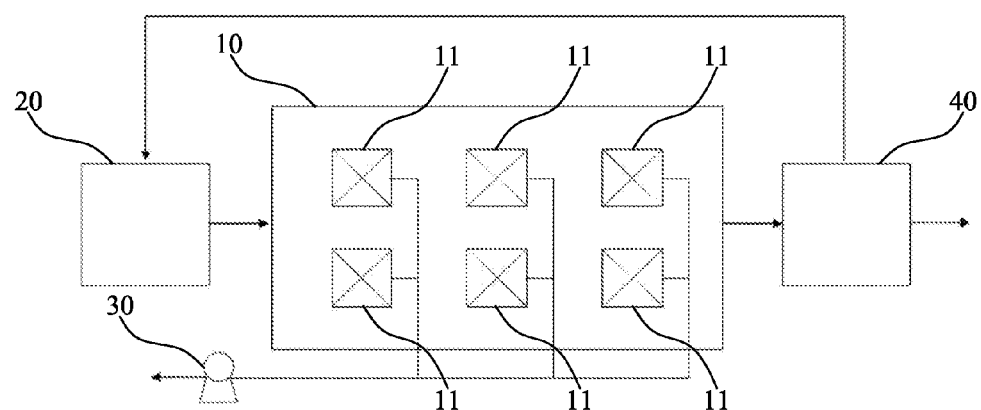
FIG. 1 schematically shows a general filtering system.
Figure 2:
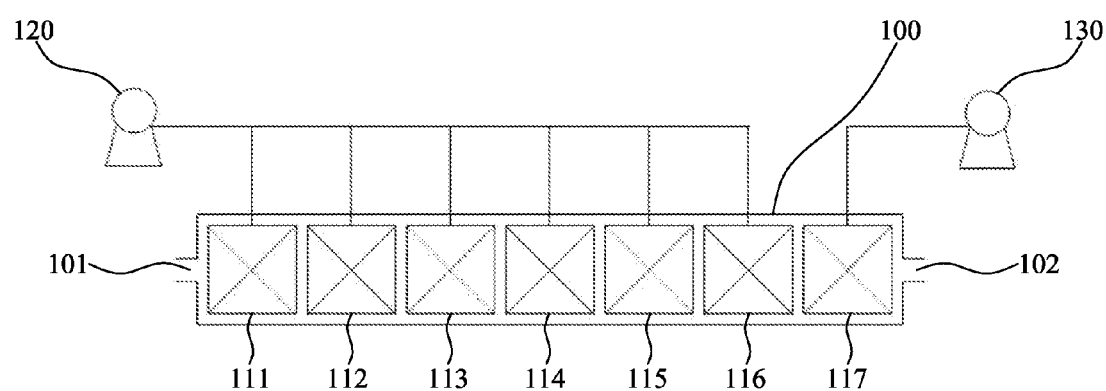
FIG. 2 schematically illustrates the filtering system according to the first embodiment of the present invention.

FIG. 2 illustrates a filtering system according to the first embodiment of the present invention.

As shown in FIG. 2, the filtering system according to the first embodiment of the present invention is provided with a water bath 100 including an inlet 101 and a discharging hole 102. At this time, feed water to be treated is supplied to the inside of the water bath 100 through the inlet 101; and concentrated water produced through filtering (hereinafter, "concentrated water") is discharged out through the discharging hole 102.

Also, plural membrane cassettes 111 to 117 are submerged into the feed water contained in the water bath 100. According to the present invention, the plural membrane cassettes 111 to 117 are linearly arranged from the side of the inlet 101 to the side of the discharging hole 102; and the plural membrane cassettes 111 to 117 are tightly packed in the water bath 100. Accordingly, the feed water supplied to the inside of the water bath 100 sequentially passes through the linearly-arranged membrane cassettes 111 to 117, instead of evenly passing through the respective membrane cassettes 111 to 117.

In more detail, the feed water supplied through the inlet 101 is first treated by the membrane cassette 111 positioned nearest to the inlet 101; and the first-treated feed water is secondly treated by the following membrane cassette 112.

Then, after the secondly-treated feed water is continuously treated by sequentially passing through the following membrane cassettes 113 to 116, the feed water is finally filtered by the membrane cassette 117 positioned nearest to the discharging hole 102.

According to the filtering system of the present invention, a gradient of impurity concentration is generated based on the place of the feed water in the water bath 100 when a water treatment process reaches an equilibrium condition. As a result, the impurity concentration of the feed water treated by the membrane cassette 111 positioned nearest to the inlet 101 is smaller than the impurity concentration of the feed water treated by the membrane cassette 117 positioned nearest to the discharging hole 102.

According to one embodiment of the present invention, the plural membrane cassettes 111 to 117 are tightly packed in the water bath 100 so as to satisfy that the impurity concentration of the feed water treated by the membrane cassette 117 positioned nearest to the discharging hole 102 is at least three times as large as the impurity concentration of the feed water treated by the membrane cassette 111 positioned nearest to the inlet 101.

The impurity concentration of the feed water treated by the membrane cassettes 111 to 117 is measured by taking the water at a predetermined point corresponding to the same height within a space of 20 cm in all directions. In this case, taking the water at the predetermined point means that the water placed at the same height is taken for measuring the impurity concentration of the feed water to be treated by the respective membrane cassettes 111 to 117.

According to the filtering system of the present invention, the feed water supplied to the inside of the water bath 100 is repetitively treated by sequentially passing through the plural membrane cassettes 111 to 117, whereby the final discharge from the water bath 100 is sufficiently concentrated. That is, the filtering system according to the present invention has a total recovery rate of 96% or more.

According the filtering system of the present invention, the impurity concentrations of the feed water treated by the respective membrane cassettes 111 to 117 are different from each other. In this respect, if the same negative pressure is applied to the respective membrane cassettes 111 to 117, the fouling levels of the respective membrane cassettes 111 to 117 would also be different from each other. That is, the membrane cassette 117 for treating the feed water having the highest impurity concentration (most concentrated water) will have the most serious membrane fouling, whereby the corresponding membrane might be damaged due to the serious fouling.

According to one embodiment of the present invention, the water to be treated passes at a first flux (LMH) through the membrane cassettes 111 to 116 positioned at the front part of the water bath 100 by supplying a first negative pressure from a first pump 120 to the membrane cassettes 111 to 116; and the water to be treated passes at a second flux (LMH) through the membrane cassette 117 positioned nearest to the discharging hole 102 by supplying a second negative pressure from a second pump 130 to the membrane cassette 117. The first negative pressure and first flux are respectively higher than the second negative pressure and second flux. The lowest negative pressure is applied to the membrane cassette 117 for treating the feed water of the highest impurity concentration (that is, the most concentrated feed water) so that it is possible to minimize the membrane fouling, and to minimize damages to the membrane.

In terms of the recovery rate, according to one embodiment of the present invention shown in FIG. 2, the membrane cassettes 111 to 116 positioned at the front part of the water bath 100 recover filtered water amounting to about 90 to 95% of the total quantity of the feed water; and the membrane cassette 117 positioned nearest to the discharging hole 102 additionally recovers filtered water amounting to about 4 to 9% of the total quantity of the feed water.

Figure 3:
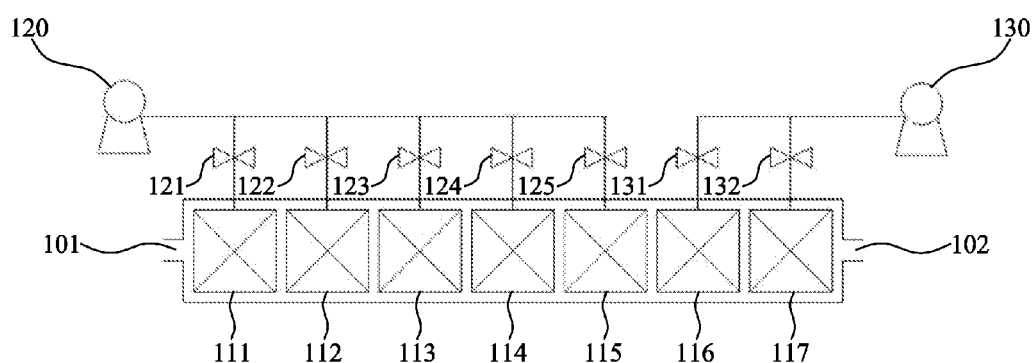
FIG. 3 schematically illustrates the filtering system according to the second embodiment of the present invention.

FIG. 3 illustrates a filtering system according to the second embodiment of the present invention.

As shown in FIG. 3, a membrane cassette 116 is connected with a second pump 130 instead of a first pump 120, wherein the membrane cassette 116 neighbors to a membrane cassette 117 positioned nearest to a discharging hole 102. That is, the membrane cassette 116 carries out a water treatment operation using a negative pressure from the second pump 130. According to the second embodiment of the present invention, since a relatively-lower negative pressure is applied to the membrane cassette 116 for treating feed water with a relatively-larger impurity concentration, a lower flux is induced at the membrane cassette 116 so that it is possible to minimize the membrane fouling and to minimize damages to the membrane.

In addition, there are valves 131 and 132 which are respectively adjusted so as to open or close the paths between the respective membrane cassettes 116 and 117 and the second pump 130. Even though a recovery cleaning which requires stopping the water treatment operation is carried out on any one of the membrane cassettes 116 and 117 connected with the second pump 130, the second pump 130 continuously supplies the negative pressure to the other membrane cassette, whereby the water treatment operation for the feed water having the high impurity concentration can be carried out without pause.

For convenience of explanation, the membrane cassette 117 positioned nearest to the discharging hole 102 is referred to as the first membrane cassette; and the membrane cassette 116 neighboring to the membrane cassette 117 is referred to as the second filtering membrane cassette. The recovery cleaning for the first membrane cassette 117 is carried out as follows. First, under the condition that the path between the second membrane cassette 116 and the second pump 130 is open, the valve 132 is adjusted so as to close the path between the first membrane cassette 117 and the second pump 130. Then, the first membrane cassette 117 is taken out from the water bath 100, and then the recovery cleaning for the first membrane cassette 117 is carried out. After completing the recover cleaning for the first membrane cassette 117, the cleaned first membrane cassette 117 is submerged into the water bath 100. Then, the valve 132 is adjusted so as to open the path between the first membrane cassette 117 and the second pump 130.

The membrane cassettes 111 to 115 positioned at the front part of the water bath 100 are connected with the first pump 120. There are valves 121 to 125 so as to open or close each path between the first pump 100 and the respective membrane cassettes 111 to 115 positioned at the front part of the water bath 100. Thus, even though the recovery cleaning is applied to any one among the membrane cassettes 111 to 115 positioned at the front part of the water bath 100, the negative pressure from the first pump 120 can be stably provided to other membrane cassettes.

The filtering system according to the second embodiment of the present invention is advantageous in that the water is continuously treated through the use of first and second pumps 120 and 130 even if the recovery cleaning is in progress for any one among the membrane cassettes 111 to 117 in the water bath 100.

Figure 4:
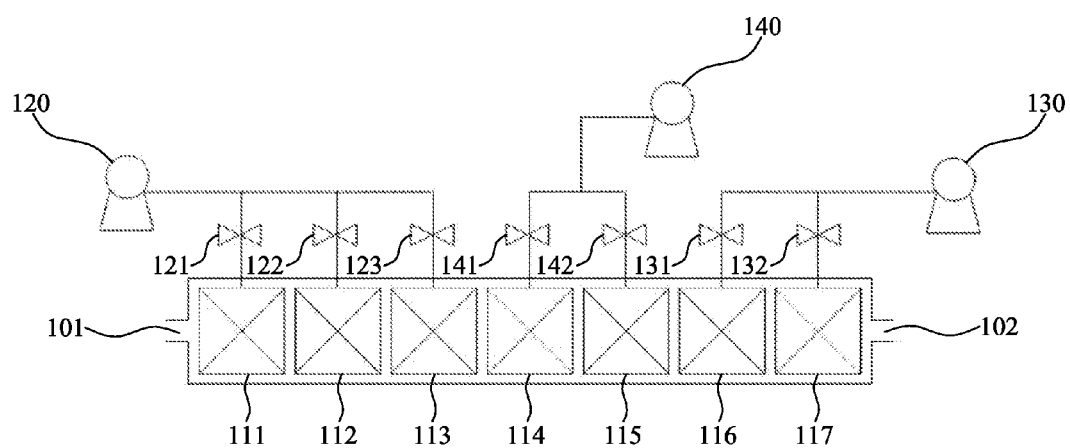
FIG. 4 schematically illustrates the filtering system according to the third embodiment of the present invention.

FIG. 4 illustrates a filtering system according to the third embodiment of the present invention.

As shown in FIG. 4, the filtering system according to the third embodiment of the present invention includes plural membrane cassettes 111 to 117 linearly arranged in a water bath 100. In this case, a first negative pressure from a first pump 120 is provided to the membrane cassettes 111 to 113 positioned near to an inlet 101 at the front part of the water bath 100; a second negative pressure from a second pump 130 is provided to the membrane cassettes 116 and 117 positioned near to a discharging hole 102 at the rear part of the water bath 100; and a third negative pressure from a third pump 140 is provided to the membrane cassettes 114 and 115 positioned at the central part of the water bath 100. The third negative pressure is lower than the first negative pressure, and is higher than the second negative pressure. A flux order of the treated water obtained through the respective membrane cassettes 111 to 117 conforms to the order of the negative pressure.

According to the third embodiment of the present invention, a load of water treatment is differently applied to the respective membrane cassettes 111 to 117 on basis of the impurity concentration of the feed water to be treated, to thereby result in proper gradient of impurity concentration generated in the water bath 100.

Alternatively, if leaving the system complexity and cost out of consideration, the filtering system may be designed in such a way that the different negative pressures are supplied to all membrane cassettes 111 to 117.

As shown in FIG. 4, the respective membrane cassettes 111 to 117 are connected with any one of the first to third pumps 120, 130, 140 through the valves. Thus, the treated water can be obtained through the use of first to third pumps 120, 130, 140 while the recovery cleaning is in progress for any one of the membrane cassettes 111 to 117.

Figure 5:
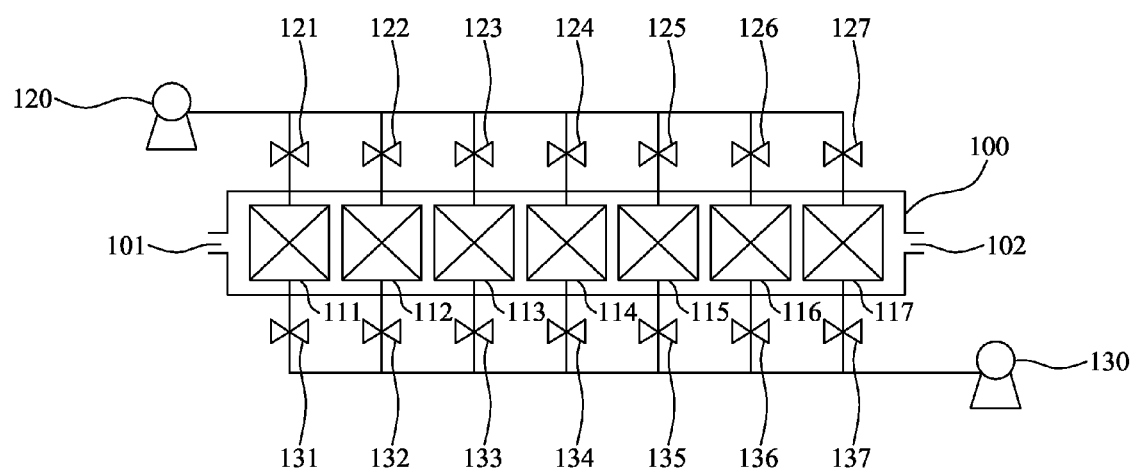
FIG. 5 schematically illustrates the filtering system according to the fourth embodiment of the present invention.

FIG. 5 illustrates a filtering system according to the fourth embodiment of the present invention.

As shown in FIG. 5, plural membrane cassettes 111 to 117 are submerged into feed water contained in a water bath 100 including an inlet 101 and a discharging hole 102. The plural membrane cassettes 111 to 117 are linearly arranged from the side of the inlet 101 to the side of the discharging hole 102. Since the plural membrane cassettes 111 to 117 are tightly packed in the water bath 100, the feed water supplied to the inside of the water bath 100 sequentially passes through the linearly-arranged membrane cassettes 111 to 117, instead of evenly passing through the respective membrane cassettes 111 to 117.

That is, a gradient of impurity concentration is generated according to the place of the feed water in the water bath 100 when a water treatment process reaches an equilibrium condition.

Thus, a relatively-lower negative pressure is applied to the membrane cassette 117, positioned nearest to the discharging hole 102, for treating the feed water having the highest impurity concentration (most concentrated feed water) so that it is possible to minimize the membrane fouling and to minimize damages to the membrane.

According to the fourth embodiment of the present invention, a first pump 120 supplies a first negative pressure to the membrane cassettes 111 to 117; and a second pump 130 supplies a second negative pressure to the membrane cassettes 111 to 117. The first and second negative pressures are different from each other, for example, the first negative pressure is higher than the second negative pressure.

There are first valves 121 to 127 and second valves 131 to 137, wherein the first valves 121 to 127 are adjusted so as to open or close each path between the first pump 120 and the respective membrane cassettes 111 to 117, and the second valves 131 to 137 are adjusted so as to open or close each path between the second pump 130 and the respective membrane cassettes 111 to 117. That is, the respective membrane cassettes 111 to 117 are separately connected with any one of the first and second pumps 120 and 130, selectively.

According to the fourth embodiment of the present invention, even though the inlet 101 and the discharging hole 102 in the water bath 100 are switched at need, that is, even though the feed water is supplied through the discharging hole 102 and the treated water is discharged out through the inlet 101, it can be immediately coped with the generation of gradient in the impurity concentration according to the place of the feed water in the water bath 100 by simply adjusting the valve, which enables to minimize the membrane fouling and damages to the membrane.

Figure 6:
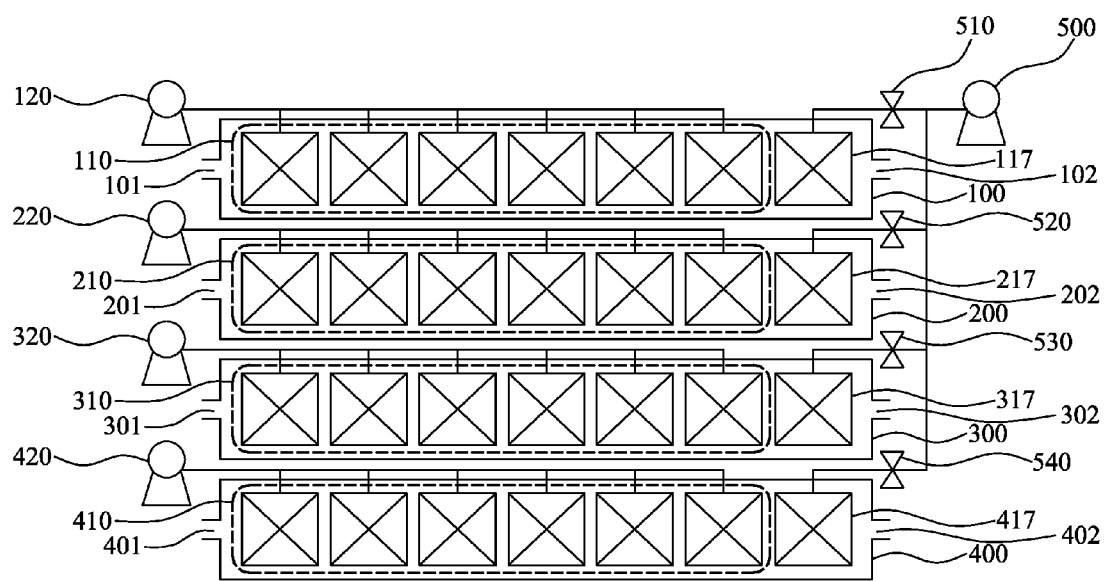
FIG. 6 schematically illustrates the filtering system according to the fifth embodiment of the present invention.

FIG. 6 illustrates a filtering system according to the fifth embodiment of the present invention.

The filtering system according to the fifth embodiment of the present invention may comprise plural complementary trays, wherein each tray includes its own water bath. Hereinafter, the filtering system according to the fifth embodiment of the present invention will be explained in detail with reference to FIG. 6.

As shown in FIG. 6, the filtering system according to the fifth embodiment of the present invention includes the first to fourth water baths 100, 200, 300, 400 arranged side by side. In the same manner as the first embodiment of the present invention, membrane cassettes 110, 117, 210, 217, 310, 317, 410, 417 are submerged into the respective water baths 100, 200, 300, 400.

First to fourth pumps 120, 220, 320, 420 for supplying a first negative pressure are respectively connected with the membrane cassettes 110, 210, 310, 410 positioned near to respective inlets 101, 201, 301, 401 at front parts of the water baths 100, 200, 300, 400. Through the use of first to fourth valves 510, 520, 530, 540, the first to fourth membrane cassettes for concentrate 117, 217, 317, 417 positioned near to respective discharging holes 102, 202, 302, 402 are connected with a common pump 500 for supplying a second negative pressure.

The first negative pressure is higher than the second negative pressure. This is because that the impurity concentration of the feed water treated by the respective membrane cassettes 110, 210, 310, 410 is smaller than the impurity concentration of the feed water treated by the respective membrane cassettes for concentrate 117, 217, 317, 417. Thus, a flux in the membrane cassettes 110, 210, 310, 410 provided with the relatively-higher negative pressure is higher than a flux in the membrane cassettes for concentrate 117, 217, 317, 417 provided with the relatively-lower negative pressure.

Optionally, the negative pressures from the first to fourth pumps 120, 220, 320, 420 may be different from one another.

According to the fifth embodiment of the present invention, the membrane cassettes for concentrate 117, 217, 317, 417 positioned near to the respective discharging holes 102, 202, 302, 402 are connected with the common pump 500, thereby resulting in simplification of system and reduction of cost.

Also, since the membrane cassettes for concentrate 117, 217, 317, 417 are connected with the common pump 500 through the use of valves 510, 520, 530, 540, the filtering system according to the fifth embodiment of the present invention enables cleaning tray by tray, which can be carried out as follows.

First, after stopping an operation of the first pump 120 for supplying the first negative pressure to the membrane cassettes 110 positioned at the front part of the first water bath 100, the first valve 510 is adjusted so as to interrupt the second negative pressure supplied from the common pump 500 to the first membrane cassette for concentrate 117. Then, the membrane cassettes 110 and the membrane cassette for concentrate 117 included in the first water bath 100 are cleaned.

After completing the cleaning for the membrane cassettes 110 and 117 in the first water bath 100, the feed water to be treated is supplied to the inside of the first water bath 100, and the first pump 120 is re-operated again. At this time, the first valve 510 is adjusted so as to release the interruption of the second negative pressure, whereby the second negative pressure is re-supplied to the first membrane cassette for concentrate 117.

After stopping an operation of the first pump 120 for supplying the first negative pressure to the membrane cassettes 210 positioned at the front part of the second water bath 200, the second valve 520 is adjusted so as to interrupt the second negative pressure supplied from the common pump 500 to the second membrane cassette for concentrate 217. Then, the membrane cassettes 210 and the membrane cassette for concentrate 217 included in the second water bath 200 are cleaned.

The third and fourth trays can be sequentially cleaned by the aforementioned process.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A filtering method using a filtering system comprising a first water bath into which a first membrane cassette and a first membrane cassette for concentrate are submerged, a second water bath into which a second membrane cassette and a second membrane cassette for concentrate are submerged, a first pump for supplying a first negative pressure to the first membrane cassette, a second pump for supplying a second negative pressure to the second membrane cassette, and a common pump for supplying a third negative pressure to the first and second membrane cassettes for concentrate, the method comprising:
    turning on the first pump, the second pump, and the common pump to supply the first negative pressure to the first membrane cassette, the second negative pressure to the second membrane cassette, and the third negative pressure to the first and second membrane cassettes for concentrate, respectively;
    turning off the first pump;
    closing a first path between the common pump and the first membrane cassette for concentrate so that the third negative pressure cannot be supplied from the common pump to the first membrane cassette for concentrate; and
    cleaning the first membrane cassette and the first membrane cassette for concentrate.

2. The filtering method of claim 1, further comprising:
    supplying feed water to be treated to the first water bath after completing the cleaning of the first membrane cassette and the first membrane cassette for concentrate;
    turning on the first pump after supplying the feed water to the first water bath;
    opening the first path so as to supply the third negative pressure to the first membrane cassette for concentrate;
    turning off the second pump;
    closing a second path between the common pump and the second membrane cassette for concentrate so that the third negative pressure cannot be supplied from the common pump to the second membrane cassette for concentrate; and
    cleaning the second membrane cassette and the second membrane cassette for concentrate.

* * * * *